United States Patent Office 3,203,865
Patented Aug. 31, 1965

3,203,865
HOG SERUM ANTIBODY CONCENTRATE
Alexander Koehler and William H. Dazey, Lebanon, Ind., assignors to The Dow Chemical Company, Midland, Mich., a corporation of Delaware
No Drawing. Filed Nov. 30, 1962, Ser. No. 241,152
7 Claims. (Cl. 167—80)

This invention is concerned with hog serum antibody concentrate and is particularly directed to a novel method for preparing such a concentrate and to the novel product so obtained.

Antiserum prepared from the blood of hogs, particularly after the producer hogs have been hyperimmunized against hog cholera and/or other swine diseases, represents one of the most widely used serum products in veterinary practice. In the preparation of such antisera, hogs previously immunized against the disease entity concerned are inoculated with a virulent form of the disease to induce the production of extra antibodies whereby the so-called hyperimmune state is achieved. Blood from such hyperimmune hogs is then employed for producing the desired antiserum.

The procedure in preparing hog-cholera hyperimmune serum is illustrative. In the preparation of such antiserum, mature hogs, previously immunized against hog cholera, are hyperimmunized, as, for example, by intravenous inoculation with a blood fraction containing virulent hog cholera virus obtained from an infected hog at the height of the disease. After a sufficient period of time for the inoculated hog to develop additional antibodies against the hog cholera virus, that is, to achieve the hyperimmune state, blood is collected from the hyperimmune hog for use in the preparation of antiserum. In such preparation, the blood is defibrinated and the red blood cells and cell debris therein removed by agglutination followed by centrifugation or filtration. The resulting clarified serum contains numerous proteinaceous constituents in addition to the desired antibody fractions. The latter have been found to be associated with the globulin fraction of such serum.

It has previously been suggested to prepare a hog cholera antibody concentrate by precipitating the globulin fraction of hyperimmune hog serum by addition of a controlled proportion of ammonium sulfate or other neutral salt. Such precipitate is separated and thereafter resuspended in an aqueous solution to provide a hog cholera antibody concentrate. In such operations, it is necessary to provide means for removing the added salt so that resuspension of the globulin fraction will occur. It has been found, however, that simple dialysis of said globulin fraction against distilled water, which is the standard process suggested in the art for the removal of such salts from protein fractions, results in a product which does not resuspend readily and which is, in addition, unstable to heat. The U.S. Department of Agriculture regulations governing the production of anti-hog cholera serum require heating of the product at 58.5° C. for 30 minutes to inactivate viruses and the like. If such a serum concentrate becomes highly viscous or if portions thereof precipitate out during the prescribed heating, it becomes virtually impossible to pass such a concentrate through a bacteriological filter to produce a sterile serum concentrate product. Failure to obtain complete resuspension of the salt-precipitated fraction or subsequent precipitation or denaturation of protein in the product by heat has further disadvantages in producing an unhomogeneous and unsightly product which may also tend to plug needles and syringes employed in its administration.

It is an object of the present invention to provide a novel hog serum antibody concentrate. It is a further object to provide such a concentrate which is sterile, clear, homogeneous and of relatively low viscosity as compared to the presently available hog serum products. Yet another object is to provide a process for the preparation of said novel concentrate. Other objects will become apparent from the following specification and claims.

In accordance with the present invention, it has been discovered that a clear, heat stable, sterilizable hog cholera antibody concentrate may be prepared by dialyzing an aqueous suspension of the ammonium sulfate-precipitated globulin-antibody fraction from hyperimmune hog blood against an aqueous 0.85 percent sodium chloride solution.

In carrying out the invention, blood from hogs hyperimmunized against hog cholera and/or other swine disease is processed in conventional fashion through the steps of defibrination, coagulation of red blood cells and subsequent clarification. The resulting clarified serum is diluted with a volume of water approximately equal to the volume of serum and the temperature of the resulting mixture adjusted within the range of from about 18° to 25° C. Sufficient of a pharmacologically acceptable acid is then added to adjust the pH of the mixture within the range of from about 5.8 to 6.2. Thereafter, sufficient of a neutral salt solution is added to accomplish precipitation of the protein fraction containing the desired antibodies. In general, it is desirable to agitate the mixture for a period of time to foster complete precipitation of the desired fraction.

On completion of the above-described precipitation, the precipitate is separated in any suitable fashion and while in a moist condition, transferred to containers prepared from semi-permeable membranes such as regenerated cellulose. Such containers with the moist paste of antibody-containing protein fraction are then immersed in a bath composed of aqueous 0.85 percent sodium chloride solution maintained at a temperature of from 0° to 5° C. In this fashion, dialysis of the contents of the vessels is continued with one or more changes of the bath liquor until the concentration of the precipitant salt is reduced to a low level and complete solution of the precipitated protein fraction has been obtained. If desired, for the second and subsequent dialysis steps, the contents of the dialysis vessels are transferred to tubes prepared from the semi-permeable membrane. Alternatively, the paste of precipitated proteins may be introduced continuously into one end of a suitable length of semi-permeable tubing while said tubing is immersed in a bath consisting of an aqueous 0.85 percent solution of sodium chloride at a temperature of from 0° to 5° C. Said protein is then passed through the tubing in countercurrent relationship to the bath liquor which is flowed past the tubing. The resulting reconstituted antibody concentrate is continually removed from the end of the tubing distal to the site of introduction of the precipitated protein.

The reconstituted antibody concentrate obtained by the above method is thereafter diluted as desired and mixed with a preservative such as thimerosal and a stabilizer such as glycine. The pH of the resulting mixture is adjusted to $7.0 \pm 0.2$ and the mixture is heated at 58°–59° C. for a period of 30 minutes to inactivate enzymes, viruses and the like. The mixture may then be sterilized by filtration through a bacteriological filter such as a Seitz filter.

Neutral salts suitable for precipitating the antibody-containing globulin fraction include sodium sulfate, magnesium sulfate and a sodium hydrogen phosphate mixture as well as ammonium sulfate. The latter is the preferred salt for use as the precipitating agent. For the adjustment of pH, any pharmacologically acceptable acid may be employed such as sulfuric, hydrochloric, acetic or succinic acid or the like. In general, hydrochloric acid is preferred for this purpose. Similarly, sodium hydroxide is preferred for the final neutralization, although other alkaline agents such as sodium carbonate may be employed if desired.

In a representative operation, blood from hogs previously hyperimmunized against hog cholera virus was processed in conventional fashion for the production of anti-hog cholera serum through the defibrinization and clarification steps to produce a batch of 60.558 liters of clarified serum. The latter was diluted with 52 liters of sterile deionized water and the resulting mixture adjusted to a temperature in the range of 20°–25° C. and mixed with 178 milliliters of 6-normal hydrochloric acid solution, sufficient to adjust the pH to 6.0. 69.316 liters of saturated ammonium sulfate solution was then added to produce a mixture having an ammonium sulfate concentration of about 40 percent of saturation at the temperature of the mixture. During the addition of the ammonium sulfate solution and for a period of about 1 hour thereafter, the mixture was agitated by a mechanical stirrer. During said agitation period, a precipitate developed in the mixture and was thereafter separated by filtration. The moist precipitate was transferred from the filter paper to regenerated cellulose film dialyzing bags (Du Pont #600 cellophane), placing about 500 grams in each bag. The bags containing the precipitate were supported in metal baskets and immersed in a bath consisting of 380 liters of aqueous 0.85 percent sodium chloride solution maintained at a temperature of 0°–5° C. Constant agitation of the bath liquid was maintained mechanically.

During the above-described dialysis step, the precipitate gradually went into solution and after a period of about 72 hours in the dialyzing bath, the proteinaceous solution from the dialyzing bags was transferred to 1.125″ diameter cellophane tubing (Du Pont #600) and the filled cellophane tubes suspended in a fresh bath containing 380 liters of 0.85 percent sodium chloride solution maintained at a temperature of 0°–5° C. Dialysis was continued with agitation of the bath contents for a period of about 24 hours. The hog cholera antibody concentrate so produced in the cellophane tubes amounted to 11.06 liters and was diluted with an aqueous solution containing sufficient sodium chloride, glycine and thimerosal to produce final concentrations of 0.85 percent sodium chloride, 2.25 percent glycine and 1:10,000 of thimerosal, respectively, in the finished product. The diluent was cooled to 0°–5° C. before addition to the antibody concentrate. Thereafter, sufficient (204.5 milliliters) of an aqueous 1 normal sodium hydroxide solution was added with stirring to adjust the final mixture to a pH of 7.0±0.2. The final volume of product was 23.4 liters.

The above product was found to contain a concentration of hog cholera antibodies at least twice that of the clarified hyperimmune serum employed as starting material. This represented an overall yield of over 90 percent of the original total antibody content, recovered in the form of a purified and stable antibody concentrate. Said product was heated to 58.5°±0.5° C. for 30 minutes, cooled immediately to 15° C. and then more gradually to 5° C., and filtered through a bacteriological filter. The product filtered readily and the filtrate was found to be sterile and to have a pH of 6.97, a protein content of about 6.00 percent by Kjeldahl analysis and an ammonium sulfate content of less than 0.1 percent.

In a similar fashion, serum antibody concentrates are prepared from hogs hyperimmunized against leptospirosis, transmissible porcine gastroenteritis and the like, as well as hog cholera. In such operations, stable, sterile antibody concentrates have been obtained containing over 5 times the initial antibody concentration of the clarified hyperimmune serum employed as starting material.

We claim:

1. In a method for the production of a hog antibody concentrate wherein a protein fraction comprising said antibodies is precipitated from clarified hog serum by the action of ammonium sulfate, the improvement which comprises redispersing the precipitated antibody fraction in an aqueous medium by dialyzing against an aqueous 0.85 percent sodium chloride solution.

2. A method according to claim 1 wherein the dialysis is carried out at a temperature of from 0° to 5° C.

3. A hog cholera antibody concentrate prepared by the method of claim 1.

4. A method which comprises the steps of diluting clarified, defibrinated serum from the blood of hogs hyperimmunized against the virus of hog cholera, adjusting the pH of the diluted mixture within the range of from 5.8 to 6.2 and the temperature of said mixture to within the range of from about 18° C. to 25° C., thereafter adding a concentrated solution of ammonium sulfate to said mixture in an amount to provide a final concentration of about 40 percent of saturation with ammonium sulfate at the temperature of the mixture, maintaining the so-treated mixture in said temperature range for a period of time to accomplish precipitation of an antibody-rich fraction of the serum, separating the precipitated fraction and redispersing same in aqueous medium by dialysis of said fraction against an aqueous 0.85 percent sodium chloride solution maintained at a temperature from about 0° to about 5° C.

5. A method which comprises the steps of diluting clarified defibrinated serum from the blood of hogs hyperimmunized against the virus of hog cholera, adjusting the pH of the diluted mixture within the range of from 5.8 to 6.2 and the temperature of said mixture to within the range of from about 18° C. to 25° C., thereafter adding a concentrated solution of ammonium sulfate to said mixture in an amount to provide a final concentration of about 40 percent of saturation with ammonium sulfate at the temperature of the mixture, maintaining the so-treated mixture in said temperature range for a period of time to accomplish precipitation of an antibody-rich fraction of the serum, separating the precipitated fraction and redispersing same in aqueous medium by dialysis of said fraction against an aqueous 0.85 percent sodium chloride solution maintained at a temperature from about 0° to about 5° C. and thereafter diluting the resulting aqueous concentrate with a solution of glycine and thimerosal in aqueous sodium chloride solution, the amounts of the latter ingredients being adjusted to provide concentrations of 0.85 percent of sodium chloride, about 0.3 molar of glycine and 1:10,000 of thimerosal, respectively, in the final mixture.

6. A method according to claim 5 wherein the final product is sterilized by filtration through a bacteriological filter.

7. A clear, homogeneous, sterile, hog cholera antibody concentrate prepared by the method of claim 6.

References Cited by the Examiner

UNITED STATES PATENTS

| | | | |
|---|---|---|---|
| 1,335,986 | 4/20 | Reichel | 167—80 |
| 2,124,951 | 7/38 | Little et al. | 167—78 |
| 2,461,505 | 2/49 | Daniel | 167—78 |
| 2,785,105 | 3/57 | Seidel et al. | 167—80 |
| 2,926,120 | 2/60 | Davenport et al. | 167—80 |

OTHER REFERENCES

Code of Federal Regulations, Title 9, Part 119, "Anti-Hog-Cholera Serum," pp. 1–2, 10, 17–18, 27–36 (per Agricultural Research Service Biological Products Memo 62.1 (May 1961), Oct. 2, 1962).

Cohn et al.: "Preparation and properties of serum and plasma proteins I–III. Size and charge of proteins separating upon equilibration across membranes with ammo- (Other references on following page)

nium sulfate solutions of controlled pH, ionic strength, and temperature," J. Am. Chem. Soc. 62, 3386–3400 (1940).

Collins: "Enhancement of Infectivity of Hog Cholera Virus—The Passage of Hog Cholera Virus Through Cellulose Dialysis Membranes," American J. of Vet. Res. 21 (82), pp. 472–477, May 1960.

Geill, T.: "Influence of the Concentration of Hydrogen Ions on the Precipitation of Albumin and Globulin of the Serum," Compt. Rend. soc. biol. 95, pp. 1101–7, 1219–1224 (1926); abstracted in English in Chem. Abstracts 22:250(4) (1928).

Koehler, A., et al.: "Development of a New Hog Cholera Antibody Concentrate—Stericon," Allied Vet. 33(2), pp. 37–44 March–April 1962 (U.S.D.A. #41.8 AL5).

Mathews, J., et al.: "Hog Cholera Protection Tests With Swine Serum Fractions"; "Hog Cholera Immune and Non-Immune Serums," Cornell Vet. 50, pages 177–182 (1960).

Stanworth: "A Rapid Method of Preparing Pure Serum Gamma-Globulin," Nature 188 (4745), pp. 156–157, Oct. 8, 1960.

Svensson: "Fractionation of Serum with Ammonium Sulfate and Water Dialysis, Studied by Electrophoresis," J. Biol. Chem. 139, pp. 805–825 (1941).

LEWIS GOTTS, *Primary Examiner.*